Nov. 6, 1923.  M. R. HUTCHISON  1,473,294
ACCESSORY FOR NOTEBOOKS OR THE LIKE
Filed Sept. 1, 1920     7 Sheets-Sheet 1

INVENTOR
Miller Reese Hutchison
BY
George C. Dean
HIS ATTORNEY

Nov. 6, 1923.

M. R. HUTCHISON 1,473,294

ACCESSORY FOR NOTEBOOKS OR THE LIKE

Filed Sept. 1, 1920   7 Sheets-Sheet 3

INVENTOR
Miller Reese Hutchison
BY
George C. Dean
HIS ATTORNEY

Nov. 6, 1923.

M. R. HUTCHISON

1,473,294

ACCESSORY FOR NOTEBOOKS OR THE LIKE

Filed Sept. 1, 1920  7 Sheets-Sheet 4

INVENTOR
Miller Reese Hutchison
BY George C. Dean
HIS ATTORNEY

Nov. 6, 1923.  
M. R. HUTCHISON  
1,473,294  
ACCESSORY FOR NOTEBOOKS OR THE LIKE  
Filed Sept. 1, 1920  
7 Sheets-Sheet 5

INVENTOR  
*Miller Reese Hutchison*  
BY  
*George C. Dean*  
HIS ATTORNEY

Patented Nov. 6, 1923.

1,473,294

UNITED STATES PATENT OFFICE.

MILLER REESE HUTCHISON, OF WEST ORANGE, NEW JERSEY.

ACCESSORY FOR NOTEBOOKS OR THE LIKE.

Application filed September 1, 1920. Serial No. 407,370.

*To all whom it may concern:*

Be it known that I, MILLER REESE HUTCHISON, a citizen of the United States, and resident of West Orange, in the county of Essex and State of New Jersey, have invented certain new and useful Improvements in Accessories for Notebooks or the like, of which the following is a specification.

My present invention relates in its more specific applications to pocket note, memorandum and address books, although it is broadly applicable to any article that is likely to be lost, that is of peculiar value to the owner and that can be carried through the mails.

The entries in a pocket memorandum, address or note book are frequently of such character as to render the book invaluable to the owner and the loss of such book would involve correspondingly serious inconvenience. The average finder who is not likely to appreciate the importance of the book to the owner realizing that it has no substantial intrinsic value will not go to the trouble and expense of returning it, even if it should bear the owner's address.

It is an object of the invention to render a note book or a similar article of the type referred to of such character as to greatly enhance the likelihood of the return thereof to the owner in case of loss.

My invention in its preferred application comprises means associated with the note book which enables the finder to return the same by mail without incurring any of the trouble and expense of obtaining an envelope or binder, addressing the same, weighing the article and securing the requisite postage stamps.

The invention may be embodied in a special construction of note book bearing an addressed stamped sheet to be applied by the finder to the outside of the book, or alternatively, the invention may comprise a separate and distinct attachment to be applied in unobtrusive position to a note book or other article of ordinary or conventional construction, the attachment bearing the owner's address and a postage stamp and being arranged to be readily adjustable by the finder for mailing the book. In the latter case, the invention resides not only in the said attachment per se, but in the combination of the note book with the attachment embodied therein.

In the preferred form, the invention comprises a binder addressed to the owner and having affixed thereto a stamp of denomination sufficient for carrying the book through the mails, the said binder including holding means for a paper money reward, and being retained in neatly folded position at the inside of the cover in a pocket formed by a covering sheet, preferably integral with the back, the cover sheet bearing directions to the finder.

In the accompanying drawings are shown several illustrative embodiments of the various features of the invention. In the drawings—

Figure 1:
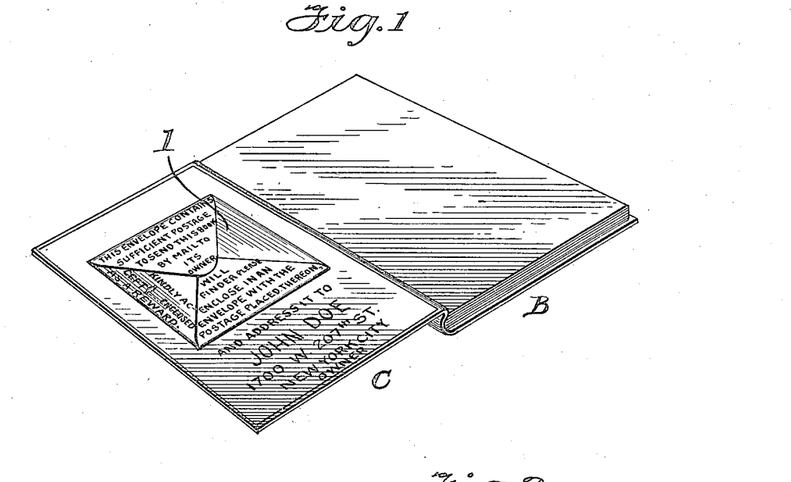
Fig. 1 shows a perspective view of a note book in open position with one form of attachment secured thereto.
Figures 2, 3:
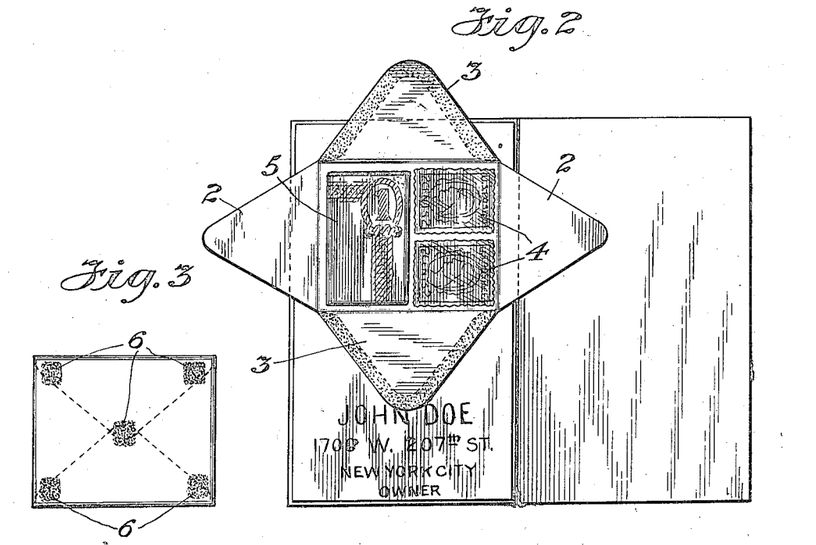
Fig. 2 is a plan view of the book in open position with the attachment spread open to reveal the interior thereof.
Fig. 3 is a rear view of the attachment.

Referring to Sheet 1 of the drawings, I have shown a note book B including a front cover C. To the rear face of the front cover is secured a small envelope 1 having end flaps 2 and side flaps 3 with gummed edges, the said envelope by preference enclosing postage stamps 4 in an amount sufficient to pass the book through the mails, the said envelope also enclosing by preference a sum of money in the form of a bill 5 of desired denomination to serve as a reward to the finder. The face of the envelope shown in Fig. 3 has gummed areas 6 by which it may be secured preferably to the inside of the front cover, as shown in Fig. 1. The envelope is preferably so pasted that it must be destroyed to permit access to the interior for removal of the stamps or the reward.

Upon the outside of the envelope are printed appropriate legends, such as shown in Fig. 1, to give the finder the directions needed for return of the book, the address of the owner preferably appearing below the envelope upon the book cover.

In carrying out the invention of Figs. 1 to 3, it is contemplated that the envelopes be separately obtained by the owner of the book who upon determining the amount of postage needed to mail the book will seal within the envelope a stamp or stamps of corresponding amount, together with a reward, if desired, and will paste the said envelope to the inside cover of the book by the gummed areas 6. If desired, the envelope may be sold as a part of the book by the manufacturer, jobber or retailer.

In the specific embodiment shown, the side of the envelope which in the normal use of envelopes would be the front, is pasted to the book and the back or flap portion of the envelope is exposed when the book is open. It will be understood that the envelope might be secured to the book in reverse relation, so that its front is exposed, in which event the legends would, of course, be printed on the front instead of on the back of the envelope.

The finder, responding to the directions, will open the envelope, remove the reward and postage stamps, using the latter for mailing the book.

Figures 4, 5, 6, 7:
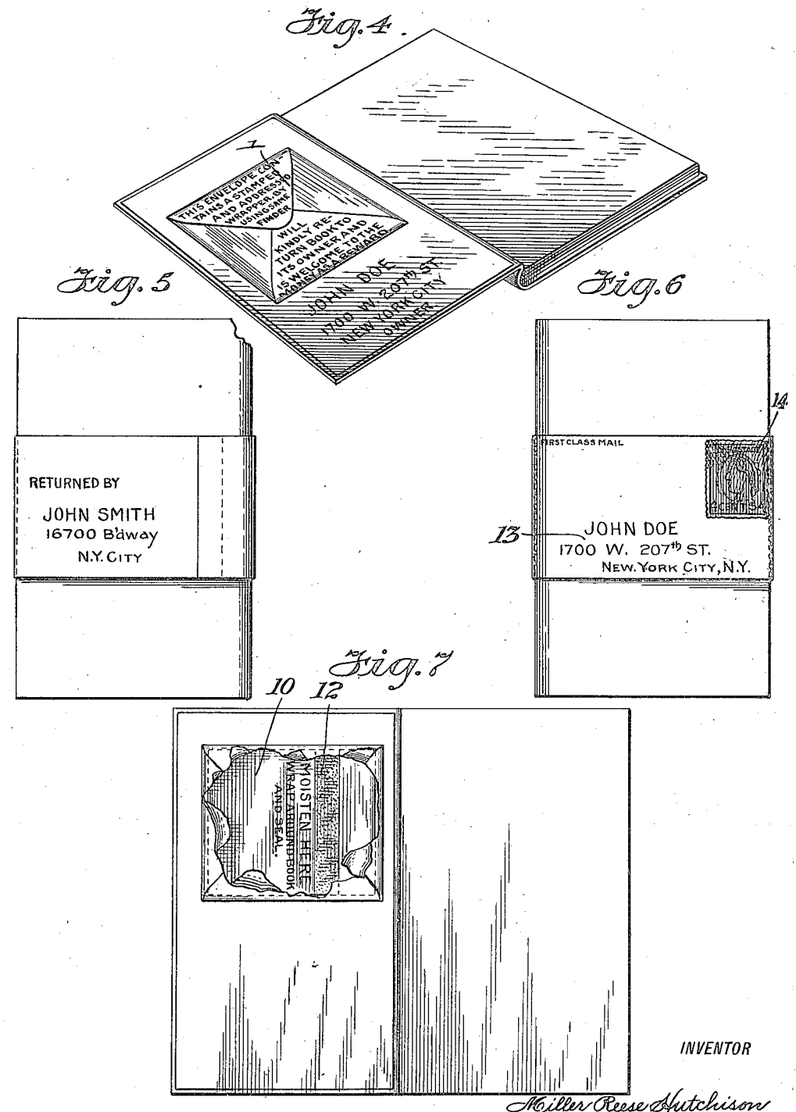
Fig. 4 is a view similar to Fig. 1, of a modified form of the invention.
Fig. 5 is a rear view of the form of Fig. 4 when about to be mailed.
Fig. 6 is a front view of Fig. 5.
Fig. 7 is a plan view of the book shown in Fig. 4 with part of the attachment broken away to reveal the interior thereof.

In the embodiment shown in Figs. 4 to 7 an envelope 1 is used similar to that of the species of Figs. 1 to 3 but enclosed therein there is a binder 10 of the general type used for mailing newspapers and magazines. This binder consists of a long rectangular strip of paper having a gummed edge shown at 12 and bears the address 13 of the owner as well as a postage stamp 14 of appropriate denomination. The directions printed upon the envelope will instruct the finder to open the same, remove the binder, wind it around the book, moisten the gummed edge 12 and seal and drop the book into a mail box. Upon the rear of the binder, the finder may write his name and address as shown in Fig. 5. If desired, a reward, as in Figs. 1 to 3 may be included in this form.

Figures 8, 9, 10, 11:
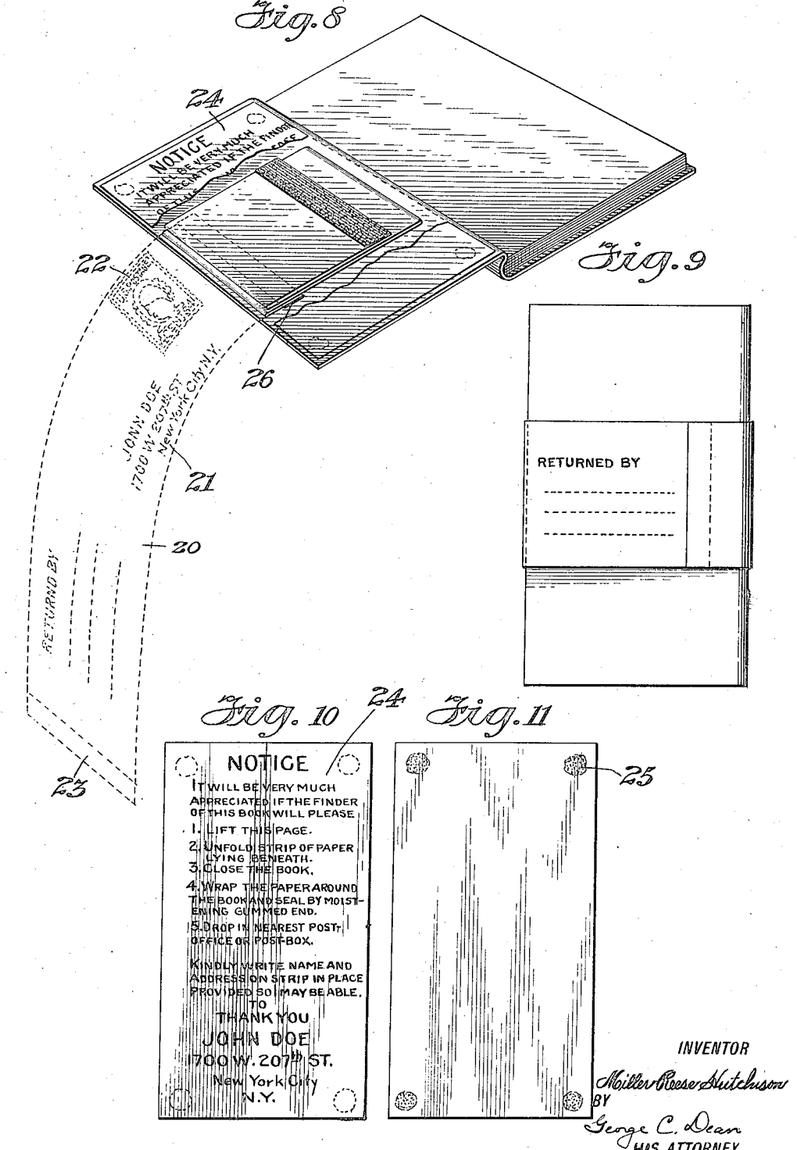
Fig. 8 is a view similar to Fig. 1 of a further modification of the invention, the wrapper being shown in dotted lines, about to be applied prior to mailing.
Fig. 9 is a plan rear view of the form of Fig. 8 when about to be mailed to the owner.
Fig. 10 is a plan view of the cover sheet.
Fig. 11 is a rear view of Fig. 10.

In Figs. 8 to 11 is shown an embodiment of the invention including a binder 20 generally similar to that shown in Figs. 4 to 7, the said binder to bear the address 21 of the owner, and a postage stamp 22 of appropriate denomination, the edge being gummed as at 23. The binder is normally neatly folded and placed against the inside of the cover of the book. To retain the binder in place, a sheet 24 of substantially the size of the book is superposed over the binder, gummed areas 25 adjacent the corners of said sheet serving to secure the same to the inside of the book cover, thereby forming a pocket for retaining the binder. The sheet 24 preferably carries the requisite instructions as shown in Fig. 10, whereby the finder will lift the sheet 24, tearing the same between the gummed areas 25, will unfold the binder or strip originally covered by the sheet and will then close the book and wrap the binder around the same, sealing the same in place by moistening the gummed edge 23, and dropping the book in a mail box. By preference the edge 26 of the strip of Fig. 8 is pasted to the inside of the cover of the book, thereby preventing loss of the binder from the pocket, and also forming an anchor for the binder so that the finder after closing the book can readily draw the strip taut prior to pasting the free gummed edge. If desired, space for the return address of the finder may be applied upon the binder, as shown in Fig. 9, to enable the owner to thank or to reward the finder.

Figure 12:
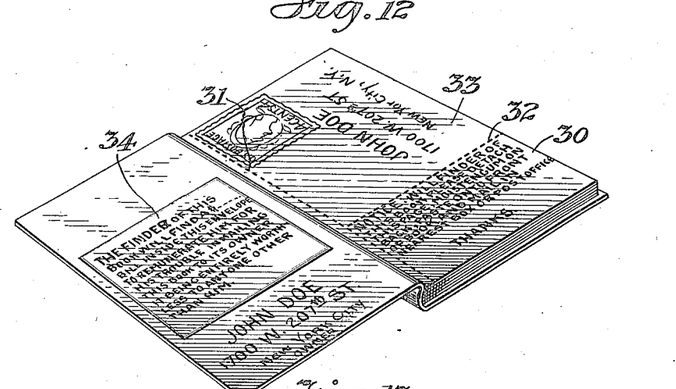
Fig. 12 is a view similar to Fig. 1 of another form of the invention.

In the embodiment of Fig. 12, the front page 30 of the book has lines or perforations 31 and 32 for facilitating removal of a sheet 33 of shorter length than that of the book, the said sheet to bear the address of the owner and a postage stamp of sufficient denomination to return the book, the back of the said sheet to be gummed (not shown). Appropriate legends are preferably provided on the sheet as shown, directing the finder to tear off the addressed sheet at the perforated lines and to paste the same upon the front of the book prior to mailing.

In this embodiment is also shown an envelope 34 secured to the inside of the cover and enclosing paper money to remunerate the finder for his trouble in mailing the book to the owner, an appropriate legend appearing on the front of the envelope as shown.

Figure 13:
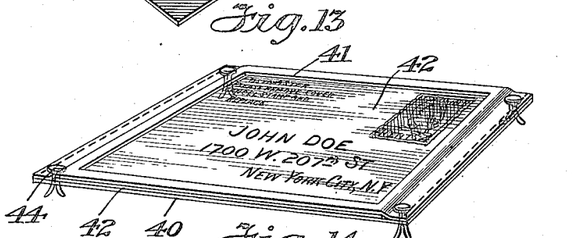
Fig. 13 is a perspective view of another form of attachment.
Figure 14:
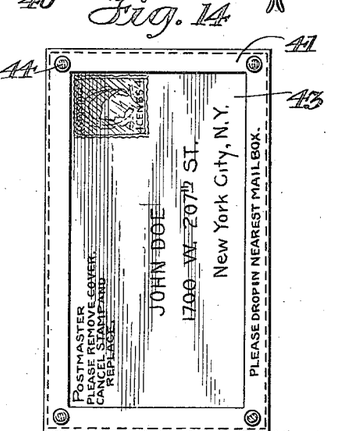
Fig. 14 is a plan view of the book with the attachment of Fig. 13 applied for mailing.

In Fig. 13 is shown an attachment to be applied to a note or memorandum book of ordinary construction, the said attachment comprising a pocket having a closed back wall 40 and an open front 41 in the form of a frame. A card 42 bearing the address of the owner and having affixed thereon a postage stamp of required denomination is inserted into the said pocket so as to be visible through the frame. A cover 43 of celluloid or other appropriate transparent material fits into the pocket to cover and protect the card. Near the corners of the pocket, metal fasteners 44 with short prongs are provided, said fasteners being for the purpose of securing the attachment to the front of a book or other article by passing the same through corresponding holes in such book or article as shown in Fig. 14. In accordance with the instruction on the card, the finder of the book need simply drop the same in a letter box, in order to return it to the owner.

Figure 15:
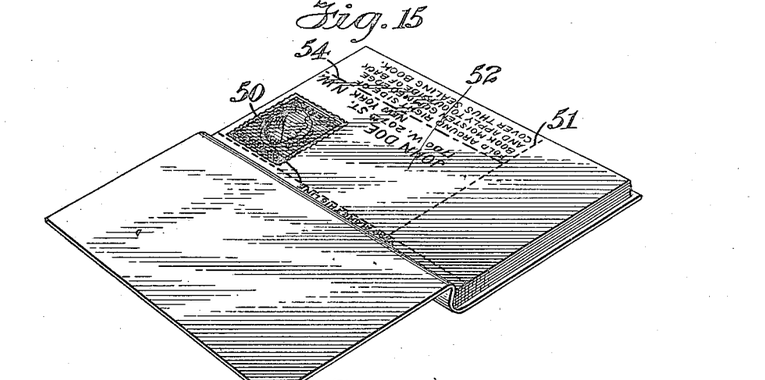
Fig. 15 is a view similar to Fig. 1 of a further modification.
Figure 16:
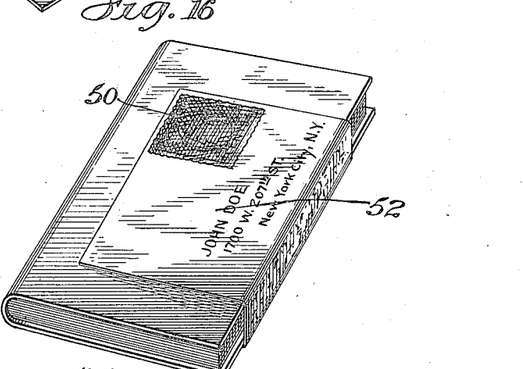
Fig. 16 is a perspective view of Fig. 15 as sent through the mails.
Figure 17:
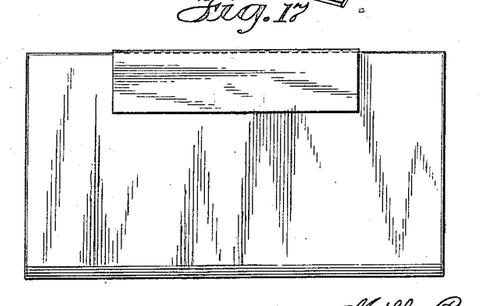
Fig. 17 is a rear view of Fig. 16.

In the embodiment shown in Figs. 15, 16 and 17, the front page of the note book is formed with special lines or perforations 50 and 51 along which it may conveniently be torn to remove sheet 52, said sheet bearing the address of the owner and an appropriate postage stamp. The construction thus far described is like that shown in Fig. 12. The rear of sheet 52 has gummed areas (not shown) at its longitudinal edges. The finder, in accordance with the directions indicated on the drawings will remove the sheet 52 by tearing along the lines of perforations 50 and 51 and will moisten the gummed edges, applying the same about the right-hand edge of the book, securing the sheet by one of the gummed edges to the rear of the book, as in Fig. 17, the other gummed edge being secured to the front of the book as in Fig. 16. If desired a line 54 may be provided on sheet 52 immediately below the address, to assist the finder in the application of the sheet for mailing. It will be seen that the addressed sheet when applied in the manner shown in Fig. 16 will keep the book closed in its passage through the mails.

Figures 18, 19, 20:
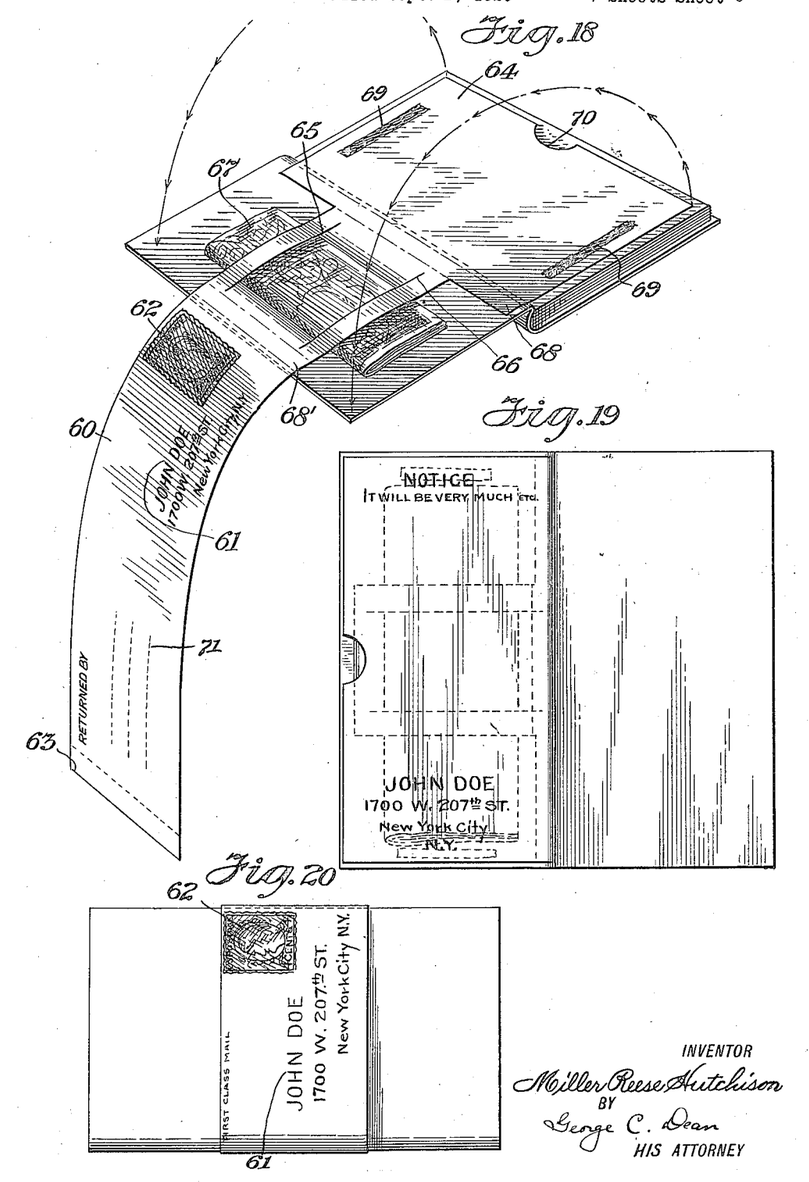
Fig. 18 is a perspective view of a still further modification, illustrating the initial step of the finder preparatory to return of the book.
Fig. 19 is a plan view of Fig. 18 in its normal position.
Fig. 20 is a plan view of the book as mailed by the finder.

In the embodiment shown in Figs. 18, 19 and 20 I have shown an attachment for application to an ordinary note book and comprising a binder 60 of the general type referred to in connection with Fig. 8 above. The binder bears the address 61 of the owner and an appropriate postage stamp 62 and has at its extreme end a gummed area 63. Integral with the binder there is preferably formed a sheet 64 of slightly smaller area than that of the note book. If desired, slits 65 and 66 may be provided longitudinally of the binder and adjacent the sheet 64 to serve as a holder for a paper money reward 67. For application of the attachment to a note book, the sheet 64 is secured to the back of the front cover and adjacent the binding as at 68 by a gummed area (not shown), and preferably also adjacent the edge as at 68' by a second gummed area (not shown). The reward 67 is slipped into the holder 65—66 in substantially the manner shown in Fig. 8 and the binder is neatly folded against the inside of the cover. The sheet 64 is now folded over the inside of the cover to conceal the binder portion and the reward, gummed areas 69 near the ends of the sheet serving to paste the same to the inside of the cover. Preferably a finger notch 70 is provided at the edge of the sheet 64. Upon the face of the sheet 64 is provided an appropriate legend, preferably identical with that shown in Fig. 10.

The finder of the book, following the instructions on the legend will grip the cover sheet at the notch 70 and will remove it by tearing between the glued areas, thus gaining access to the enclosed binder and to the reward. He will close the book, wrap the binder therearound, moistening the gummed area 63 to seal the binder and will apply his return address, if he desires, on the reverse of the binder, at the place provided therefor at 71 and will deposit the book in a mail box.

Figure 21:
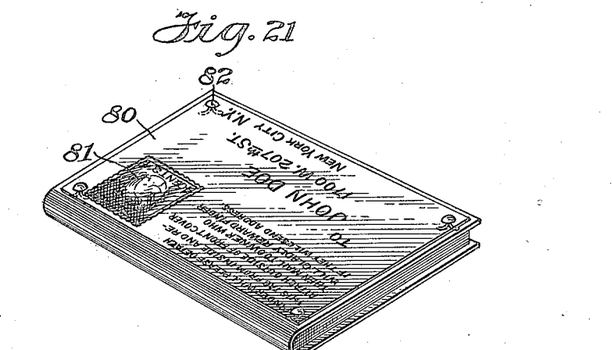
Fig. 21 is a view similar to Fig. 1 of a still further modification.
Figures 22, 23:
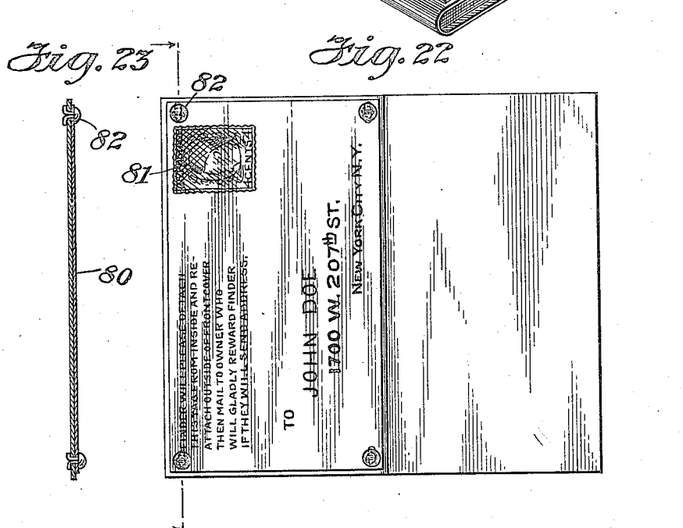
Fig. 22 is a plan view of the open book.
Fig. 23 is a longitudinal sectional view taken on the line 23—23 of Fig. 22.
Figure 24:
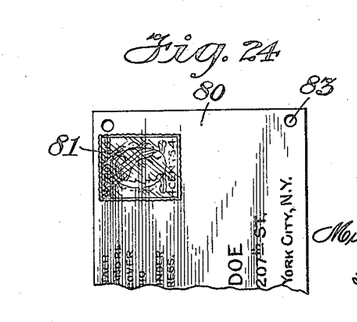
Fig. 24 is a broken plan view of the addressed card of the species shown in Figs. 21 to 24.

The form of the invention shown in Figs. 21 to 24 includes a card 80 of slightly smaller dimensions than those of the book and is addressed to the owner and bears an appropriate postage stamp 81 and also a legend giving directions to the finder. Preferably the card is attached to the inside of the book cover, as shown in Fig. 22 by ordinary metal fasteners 82 with short prongs, these fasteners extending through apertures 83 near the corners of the card and corresponding apertures in the cover of the book.

The finder of the book following the directions will simply remove the fasteners, take the card from its position on the inside of the cover, superpose it upon the outside of the cover and reapply the fasteners so that the card is in the position shown in Fig.

21, whereupon he will deposit the book in a mail box.

If, in any of the forms of my invention, the stamp or stamps were readily accessible and removable for general use, the owner of a book with my attachment might be tempted to borrow one or more of the stamps therein, particularly at a time when stamps are not obtainable, and he might thereby destroy the efficacy of the attachment. In all of the forms of my invention, except that shown in Figs. 1 to 3, the postage stamp or stamps are pasted to or form part of a binder, sheet or card so that they are useful only in the execution of the objects of my invention and the owner would, therefore, have no occasion to destroy the attachment.

In the form shown in Figs. 1 to 3 in which the stamps are enclosed in an envelope and the envelope must be destroyed to remove its contents, it is to be noted that if the envelope is opened, to remove less than all of the stamps, it becomes useless as a holder for the remaining stamp or stamps. Accordingly, in all of the forms of the invention, the self-returning feature or attachment is so arranged as to render inconvenient, undesirable or annoying the removal by the owner of the stamp or stamps or any one of the stamps associated therewith.

I claim:

1. An article of manufacture embodying an auxiliary carrying means for postage stamps in amount sufficient for carrying said article in the mails, said carrying means protecting all of the stamps and preventing convenient access thereto or use thereof other than for mailing the article.

2. A note book or like article having a cover, an auxiliary carrying means for postage stamps in amount sufficient for carrying said article in the mails, said carrying means being secured adjacent the back face of said cover and having means to protect all of the stamps throughout the normal use of the book and preventing convenient access thereto or use thereof, other than for mailing the note book.

3. A note book or like article having attached with respect thereto and in unobtrusive position an addressed sheet bearing postage stamps to render likely the return of the book when lost.

4. A note book or like article having removably secured with respect thereto in unobtrusive and protected position and concealed when the book is closed, an addressed sheet having postage stamps, whereby the sheet would be removed by a finder and applied at the outside of the book for mailing.

5. A note book or like article having removably secured with respect thereto in unobtrusive and protected position and concealed when the book is closed, an addressed paper element, the said element to be removed and applied by a finder at the outside of the book for mailing, the said element having means whereby it may be applied about the edge of the book to prevent opening thereof in the mail.

6. A note book or like article having attached with respect thereto and in unobtrusive and protected position, a binder bearing an address and a postage stamp, said binder to be wound around the book by a finder for mailing.

7. A note book having pasted thereto one edge of a binder bearing an address and a postage stamp of a denomination sufficient to carry the book through the mails, said binder being normally folded and disposed in unobtrusive position within the book and having a gummed area at its free edge, whereby the finder of the book will unfold said binder and wind it around the book, securing its gummed free edge, for mailing the book.

8. A note book or like article having attached thereto one end of a binder bearing an address and a postage stamp of a denomination sufficient to carry the book through the mails, said binder being folded against the inside of the cover of the book, and a sheet of paper extending over the folded binder and pasted to said cover to hold said binder in place.

9. A note book or like article having a cover, and auxiliary carrying means for a postage stamp of a denomination sufficient for mailing the article and for a reward, said carrying means being secured adjacent the inside face of the cover and concealing the reward, whereby, appropriate directions appearing, a finder is likely to mail the book to the owner.

10. A note book having a cover and including a binder secured thereto near one edge, said binder bearing an address and a postage stamp of a denomination to carry the book through the mails, said binder having slits for holding a reward in the form of a bill, said binder being normally folded against said cover, and a sheet of paper pasted adjacent the edge of said cover to conceal the reward and to retain the binder against unfolding, whereby, appropriate directions appearing, the finder is likely to return the book to the owner.

11. As an article of manufacture, an attachment for a note book or the like to render probable the return thereof if lost, said attachment including a sheet of paper comprising a neatly folded binder portion and a cover sheet integral therewith, and gummed areas on the lower surface of said binder portion and near the free end thereof and on a portion of said cover extending beyond said binder portion.

12. As an article of manufacture, an attachment for a note book or the like to render probable the return thereof if lost, said attachment including a sheet of paper comprising a neatly folded binder portion bearing the address of the owner and a postage stamp of denomination sufficient to carry the book or the like to which the attachment is to be applied through the mails, a cover sheet integral with said binder portion, gummed areas on the lower surface of said binder portion and near the free end thereof and on a portion of said cover extending beyond said binder portion, said attachment having a pair of parallel slits concealed by said cover sheet, said slits serving as a holder for a paper money reward to the finder.

Signed at New York, in the county of New York and State of New York.

MILLER REESE HUTCHISON.